US011156587B2

United States Patent
Xu et al.

(10) Patent No.: US 11,156,587 B2
(45) Date of Patent: Oct. 26, 2021

(54) FLEXIBLE SENSOR WITH PIEZOELECTRIC ARRAY APPLIED FOR WELD DEFECT DETECTION BASED ON FEATURE GUIDED WAVES AND ITS TESTING METHOD

(71) Applicant: JIANGSU UNIVERSITY, Jiangsu (CN)

(72) Inventors: Zhenying Xu, Jiangsu (CN); Hong Hong, Jiangsu (CN); Xiaolong Zhang, Jiangsu (CN); Han Du, Jiangsu (CN); Dongyan Wan, Jiangsu (CN); Yun Wang, Jiangsu (CN)

(73) Assignee: JIANGSU UNIVERSITY

( * ) Notice: Subject to any disclaimer, the term of this patent is extended or adjusted under 35 U.S.C. 154(b) by 53 days.

(21) Appl. No.: 16/074,034

(22) PCT Filed: Sep. 1, 2017

(86) PCT No.: PCT/CN2017/100108
§ 371 (c)(1),
(2) Date: Jul. 30, 2018

(87) PCT Pub. No.: WO2019/033466
PCT Pub. Date: Feb. 21, 2019

(65) Prior Publication Data
US 2021/0208104 A1 Jul. 8, 2021

(30) Foreign Application Priority Data
Aug. 18, 2017 (CN) .......................... 201710712559.0

(51) Int. Cl.
*G01N 29/24* (2006.01)
*G01N 29/34* (2006.01)
(Continued)

(52) U.S. Cl.
CPC ........... *G01N 29/04* (2013.01); *G01N 29/245* (2013.01); *G01N 29/34* (2013.01);
(Continued)

(58) Field of Classification Search
CPC ........ G01N 29/04; G01N 29/24; G01N 29/44; G01N 29/34; G01N 2291/0289; G01N 2291/267; G01N 2291/106
(Continued)

(56) References Cited

U.S. PATENT DOCUMENTS 6,373,245 B1 * 4/2002 Kwun .................... G01N 29/11
324/240
6,429,650 B1 * 8/2002 Kwun .................... G01N 29/11
324/220

FOREIGN PATENT DOCUMENTS

CN 101666783 * 3/2010
CN 202285038 * 6/2012
(Continued)

OTHER PUBLICATIONS

Hong et al., "Piezoelectric Sensor Based on Feature-guided Wave for Weld NDT," Instrument Technique and Sensor, 2016, No. 3, abstract only (4 pgs).
(Continued)

*Primary Examiner* — Jacques M Saint Surin
(74) *Attorney, Agent, or Firm* — Hayes Soloway P.C.

(57) ABSTRACT

Provided is a sensor and method for weld defect detection. The sensor includes several piezoelectric elements which form a matrix arranged on a flexible substrate. Each piezoelectric element is covered with a damping block and surrounded by sound absorbing material, within a flexible protective film. The sensor is simple, highly adaptable and high detection efficiency, which is especially suitable for the
(Continued)

quick in-service inspection of long distance welds in large equipment, it has high degree of automation.

10 Claims, 3 Drawing Sheets

(51) Int. Cl.
   *G01N 29/44* (2006.01)
   *G01N 29/04* (2006.01)
(52) U.S. Cl.
   CPC . *G01N 29/4463* (2013.01); *G01N 2291/0289* (2013.01); *G01N 2291/106* (2013.01); *G01N 2291/267* (2013.01)
(58) Field of Classification Search
   USPC .......................................................... 73/588
   See application file for complete search history.

(56) References Cited

FOREIGN PATENT DOCUMENTS

| | | | |
|---|---|---|---|
| CN | 103977949 | 8/2014 | ................ B06B 1/06 |
| CN | 106198725 | 12/2016 | ............. G01N 29/04 |
| CN | 106706178 | 5/2017 | ................ G01L 1/16 |
| CN | 107748200 | * 3/2018 | |
| WO | WO2019033466 | * 2/2019 | |

OTHER PUBLICATIONS

Xu et al., "A Piezoelectric Transducer for Weld Defec Detection Based on First-order Shear Horizontal ($SH_1$) Mode," 2015 Symposium on Piezoelectricity, Acoustic Waves, and Device Applications, Oct. 30-Nov. 2 (5 pgs).

* cited by examiner

FLEXIBLE SENSOR WITH PIEZOELECTRIC ARRAY APPLIED FOR WELD DEFECT DETECTION BASED ON FEATURE GUIDED WAVES AND ITS TESTING METHOD

TECHNICAL FIELD

The invention belongs to the field of non-destructive testing, in particular relates to a flexible sensor with piezoelectric array applied for weld defect detection based on Feature Guided Waves and its testing method.

BACKGROUND TECHNOLOGY

Welding is a common production technology in our lives, which plays an important role in modem industrial production, it is key technology of manufacturing large structures such as pressure vessels, ships and offshore platform etc. According to statistics, in the manufacture of pressure vessels, welding accounts for more than 30% of the total workload, so it has a direct impact on the structure quality and safety.

Ultrasonic testing is one of the most widely used non-destructive testing methods for welds, compared with other non-destructive testing methods, it has a series of advantages such as wide and deep detection range, accurate defect positioning, high detection sensitivity, low cost, harmless to the human body and easy for on-site testing. Therefore, great importance has been attached to the ultrasonic testing in the world. However, it is difficult to quantitatively judge the characters of defects, and the detection efficiency is not high because of point-by-point scanning method, so it is hard to meet the requirement of today's society for comprehensive and rapid detection of large complex structures.

Recently, ultrasonic guided wave testing has become a new method, it uses interaction of ultrasonic guided wave with tested object, realizing defect detection, geometry measurement and mechanical characterization of tested object according to reflection, transmission and scattering behavior of ultrasonic waves. Compared with traditional ultrasonic testing method, ultrasonic guided wave has advantages of long propagation distance and fast detection efficiency, besides, the integrity information can be acquired from received signals between excitation and reception points, thus has broad application prospects.

At present, a new guided wave pipe detector represented by ultrasonic guided wave technique has been put into application in foreign countries, which represents a new development direction for pipe defect detection because of its high efficiency and can realize on-site detection, so the application of ultrasonic guided wave testing will be more and more widely.

From the study of domestic and foreign scholars, it is found that the ultrasonic guided wave not only exists in some simple structures such as pipelines, but also can be formed in some feature structures with complex shape such as T type or butt welded plates and tracks, it can propagate along the waveguide. This provides a theoretical basis for the application of weld guided wave inspection, and also shows broad prospect of ultrasonic guided wave in weld defect detection field. Since the technology of weld defect detection based on feature guided waves is not mature, there are few specialized weld guided wave detection sensors at home and abroad. On the one hand, the received reflection signal is clean for one dimensional structures such as pipes and rails, but for two dimensional structures such as weld, the reflection waveform is complicated because of the multimode and dispersion characteristics of feature guided wave, so how to excite single mode with high energy reflectivity signal has become a difficulty, the sensitivity of different wave modes to different types of defects should be considered as well. On the other hand, due to the diversity of weld structures, the surface curvature and weld width are different with different thickness of welds. In order to increase the coupling between sensors and different weld structures, higher requirements have been put forward for the structure of sensor.

The Chinese patent CN106706178A discloses a pressure sensor array with multi-dimensional rod structure and its integration method, including several multi-dimensional rods and wires, the sensor can monitor the stress and strain change of structure, realizing detection of damage parts. However, the sensor is suitable for testing compression structure instead of welds.

The Chinese patent CN103977949A discloses a flexible comb sensor with phased array based on the guided waves, the sensor can excite and receive guided waves in a curved plate or tube, and realize deflection and focusing of sound beam with phase delay. It is suitable for defect detection of curved plates with variable curvature and tubes. For weld testing, it has weak adaptability to the change of length and width of welds, and the array detection method is relatively simple, so the detection sensitivity to different weld structures needs to be improved.

CONTENTS OF THE INVENTION

According to the insufficient of existing technology, the invention publishes a flexible sensor with piezoelectric array applied for weld defect detection based on Feature Guided Waves and its testing method, which can solve the problem of low precision and poor adaptability of traditional weld defect detection technology.

A flexible sensor with piezoelectric array applied for weld defect detection based on Feature Guided Waves, the described sensor comprises of several piezoelectric elements which form a matrix, and arranged on a flexible substrate; Each described piezoelectric element is covered with a damping block; Described damping block and described piezoelectric element are surrounded by sound absorbing material; The shell of described sensor is packet with flexible protective film;

Negative electrode wires of all described piezoelectric elements are parallel connected to negative electrode bus, each positive electrode wire of all described piezoelectric elements cascades a logic switch and a delayer, then parallel connects to positive electrode bus; Described positive electrode bus and negative electrode bus are wired out by positive electrode interface and negative electrode interface respectively, then connect to external equipment.

Further, each described piezoelectric element is a long strip, including: positive electrode layer, negative electrode layer and piezoelectric layer; The described piezoelectric layer is hold by positive electrode layer and negative electrode layer respectively from upper and bottom or left and right.

Further, described piezoelectric layer is made of piezoelectric ceramic or piezoelectric composite material; The material of described positive electrode layer and negative electrode layer can be silver, copper, gold or platinum.

Further, described piezoelectric elements can be divided into three types, and excite three different modes of Feature Guided Waves respectively, they have different sensitivity to different types of defects which can realize complement:

Type 1, the polarization direction of described piezoelectric element is along the width direction; The positive electrode layer and negative electrode layer are located in the left and right sides which is perpendicular to the length direction, and clamp left and right with piezoelectric layer; The size of described piezoelectric element satisfies: length/thickness≥10, length/width≥2;

Type 2, the polarization direction of described piezoelectric element is along the width direction; The positive electrode layer and negative electrode layer are located on the top and bottom surfaces which is perpendicular to the thickness direction, and clamp up and down with piezoelectric layer; The size of described piezoelectric element satisfies: length/thickness≥10, length/width≥2;

Type 3, the polarization direction of described piezoelectric element is along the thickness direction; The positive electrode layer and negative electrode layer are located on the top and bottom surfaces which is perpendicular to the thickness direction, and clamp up and down with piezoelectric layer; The size of described piezoelectric element satisfies: (length/thickness)$^2$≥10, (length/width)$^2$≥10.

Further, described flexible substrate is made of flexible film material with large acoustic transmission coefficient, it can fix and protect piezoelectric element as well; The described flexible substrate is closely bonded to the upper surface of the inspected weld with a certain curvature during testing.

Further, described damping block is made of epoxy resin composite material, matched with the acoustic impedance of piezoelectric element to reduce vibration; Described sound absorbing material adopts flexible sound absorbing filler to absorb additional waves, and fix piezoelectric element, damping block and several kinds of wires at the same time.

Further, described logic switch is used to control the working state of corresponding piezoelectric element, selecting testing method with different piezoelectric array through opening and closing logic switches; The piezoelectric array can include: linear type, T type and rectangular type array, at the same time, it can adapt to inspected welds with different width and length.

Further, the excitation time difference of each piezoelectric element can be adjusted by the described delayer, to realize the synthesis and focusing of sound beam.

A testing method for the described flexible sensor with piezoelectric array applied for weld defect detection based on Feature Guided Waves, including the following steps:

Step (1), put two described sensors closely bonded to the upper end surface of the inspected weld in plate, the length direction of piezoelectric element of described sensor is parallel to the length of inspected weld; The sensor near the end of inspected weld is excitation sensor, another one is reception sensor, the spacing between described excitation sensor and reception sensor is more than 10 cm; The positive electrode interface of described excitation sensor is connected to the signal output port of signal generator, The positive electrode interface of described reception sensor is connected to pre-amplifier; The described pre-amplifier is connected to filter circuit; The described filter circuit is connected to signal collection board; The described signal collection board is connected to upper computer; The described upper computer has multi-channel signal processing software, which is used for signal analysis and extraction of defect information;

Step (2), before testing, the logic switches of described excitation sensor are set up firstly to select the testing method with piezoelectric array; At the same time, the delayer of described excitation sensor are set up to improve the consistency of sound beam; Then, the logic switches and delayer of described reception sensor are set up, making one of the piezoelectric element work as a signal reception point;

Step (3), when testing, open the described signal generator, producing HANNING windowed tone burst signal as excitation signal and transferred to the excitation sensor; The described excitation sensor excites Feature Guided Waves in the inspected weld which can propagate along the inspected weld; Then the reflected signal is received by reception sensor; After the signal amplification and signal smoothing by pre-amplifier and filter circuit, the reflected signal would be collected and recorded by described signal collection board, and transferred to the upper computer; So far, the first set of data collection is completed;

Step (4), change the logic switches and delayer of described reception sensor and make the other piezoelectric element work as a signal reception point; Repeat Step 3 and collect a second set of data. Similarly, the N th set of data is collected;

Step (5), use multi-channel signal processing software in the described upper computer to analyze multiple sets of data, extract defect information and generate testing reports;

Step (6), finish the testing and tidy up the instruments.

The beneficial effects of the invention are as follows:

(1) For different inspected welds with various curvature surfaces and structures, the flexible design of the invention can be closely bonded to the upper surface of the inspected weld, and meet the requirement of inspected weld with different curvature surfaces; Besides, the designed sensor of the invention has multiple logic switches, which can adapt to the requirement of inspected welds with different width by selecting the working state of corresponding piezoelectric element, the demands of long-distance weld inspection for more energy can be met by increasing the number of piezoelectric elements.

(2) The piezoelectric elements of designed sensor in the invention can be divided into three types, and excite three different modes of Feature Guided Waves respectively, they have different sensitivity to different types of defects which can realize complement and improve detection accuracy, especially for crack defects with various growth directions and locations that commonly existed in industrial production.

(3) The testing method with different piezoelectric array of designed sensor in the invention can be selected, such as linear type, T type and rectangular type array, the detection sensitivity to different weld structures is adjustable. At the same time, the excitation time difference of each piezoelectric element can be adjusted by the delayer, to realize the synthesis and focusing of sound beam.

(4) The testing method adopted in the invention can collect multiple sets of data from different signal reception points, and analyzed with multi-channel signal processing software in the upper computer, it can improve the precision of defect detection and operate easily.

INSTRUCTION OF ATTACHED FIGURES

Among them, 1—plate; 2—inspected weld; 3—signal generator; 4—pre-amplifier; 5—filter circuit; 6—signal collection board; 7—upper computer; 8—sensor; 81—excitation sensor; 82—reception sensor; 801—piezoelectric element; 802—damping block; 803—flexible substrate; 804—sound absorbing material; 805—flexible protective film; 806—negative electrode wire; 807—positive electrode wire; 808—negative electrode bus; 809—positive electrode bus; 810—logic switch; 811—delayer; 812—negative electrode interface; 813—positive electrode interface; 814—negative electrode layer; 815—positive electrode layer; 816—piezoelectric layer; 817—polarization direction.

SPECIFIC IMPLEMENTATION MODE

The following is a further description of the invention in combination with the attached figures and specific embodiments. However, the protection of the invention is not limited to this.

Figure 1:
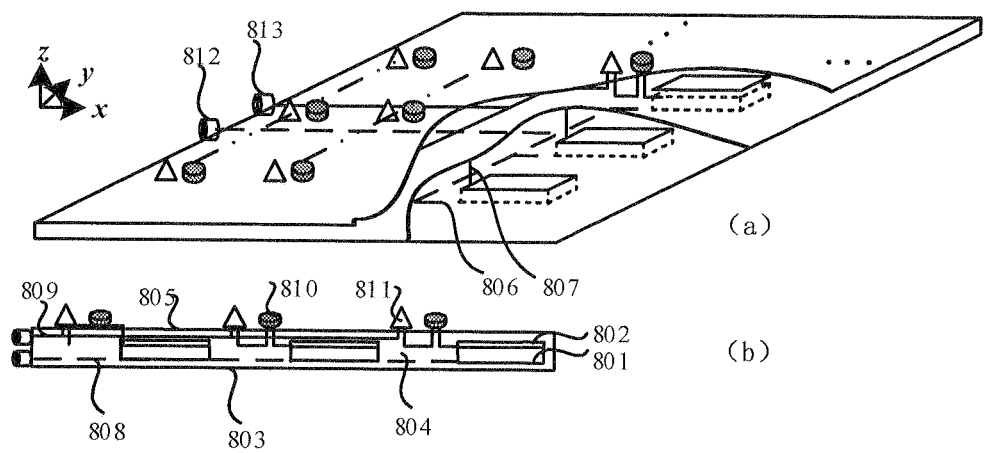
FIG. 1 is the structural diagram of a flexible sensor with piezoelectric array applied for weld defect detection based on Feature Guided Waves, (a) is three-dimensional section view; (b) is two-dimensional front view (internal structure)

FIG. 1 shows a flexible sensor with piezoelectric array applied for weld defect detection based on Feature Guided Waves, the sensor comprises of several piezoelectric elements 801 which form a matrix, and arranged on a flexible substrate 803; Each piezoelectric element 801 is covered with a damping block 802; Damping block 802 and piezoelectric element 801 are surrounded by sound absorbing material 804; The shell of sensor 8 is packet with flexible protective film 805;

Negative electrode wires 806 of all piezoelectric elements 801 are parallel connected to negative electrode bus 808, each positive electrode wire 807 of all piezoelectric elements 801 cascades a logic switch 810 and a delayer 811, then parallel connects to positive electrode bus 809; Positive electrode bus 809 and negative electrode bus 808 are wired out by positive electrode interface 813 and negative electrode interface 812 respectively, then connect to external equipment.

Each piezoelectric element 801 is a long strip, including: positive electrode layer 815, negative electrode layer 814 and piezoelectric layer 816; The piezoelectric layer 816 is hold by positive electrode layer 815 and negative electrode layer 814 respectively from upper and bottom or left and right.

Piezoelectric layer 816 is made of piezoelectric ceramic or piezoelectric composite material, the invention prefers piezoelectric ceramic PZT-5 material; The material of positive electrode layer 815 and negative electrode layer 814 can be silver, copper, gold or platinum, the invention prefers silver material.

Figure 2:
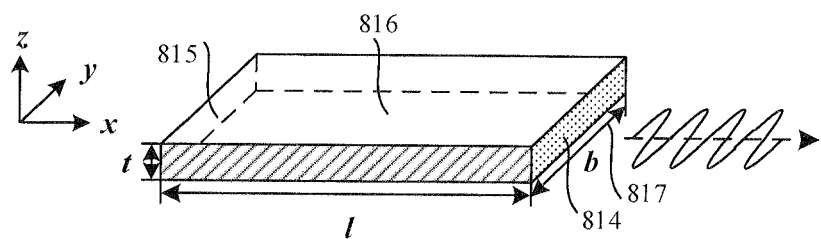
FIG. 2 is structural diagram and excited waveform of the first type piezoelectric element. (The polarization direction of described piezoelectric element is along the width direction, and the positive electrode layer and negative electrode layer are located in the left and right sides which is perpendicular to the length direction)
Figure 3:
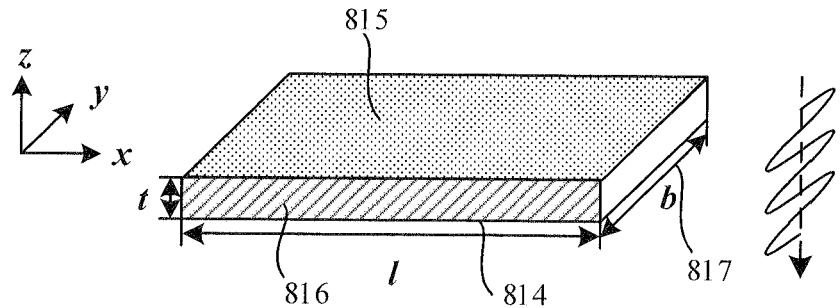
FIG. 3 is structural diagram and excited waveform of the second type piezoelectric element. (The polarization direction of described piezoelectric element is along the width direction, and the positive electrode layer and negative electrode layer are located on the top and bottom surfaces which is perpendicular to the thickness direction)
Figure 4:
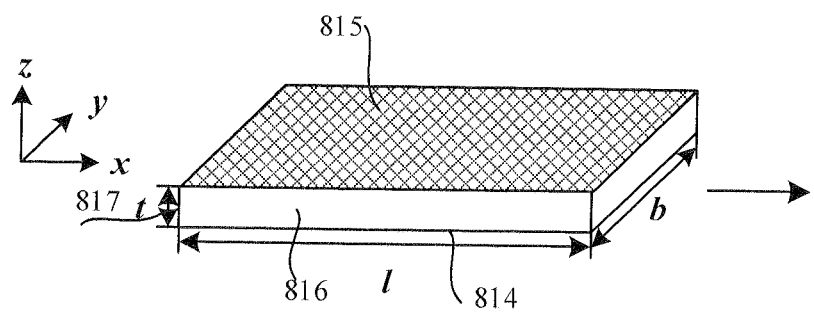
FIG. 4 is structural diagram and excited waveform of the third type piezoelectric element. (The polarization direction of described piezoelectric element is along the thickness direction, and the positive electrode layer and negative electrode layer are located on the top and bottom surfaces which is perpendicular to the thickness direction)
Figure 5:
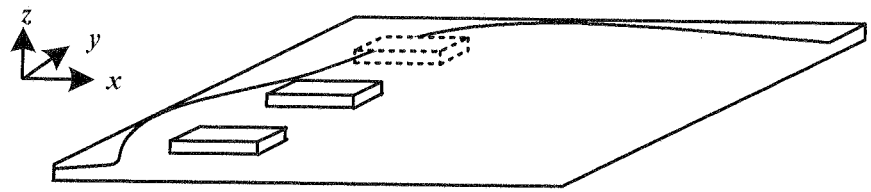
FIG. 5 is working schematic of sensor with circumferential piezoelectric array.
Figure 6:
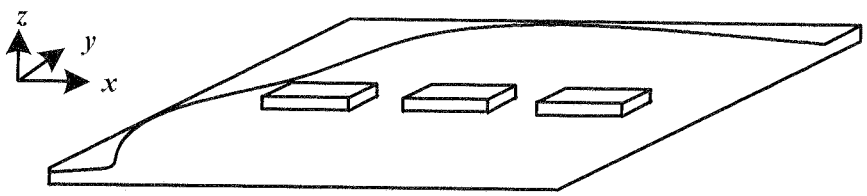
FIG. 6 is working schematic of sensor with axial piezoelectric array.

Piezoelectric elements 801 can be divided into three types, and excite three different modes of Feature Guided Waves respectively, they have different sensitivity to different types of defects which can realize complement:

Type 1, as FIG. 2, the polarization direction 817 of piezoelectric element 801 is along the width direction; The positive electrode layer 815 and negative electrode layer 814 are located in the left and right sides which is perpendicular to the length direction, and clamp left and right with piezoelectric layer 816; The size of piezoelectric element 801 satisfies: length/thickness≥10, length/width≥2, the invention prefers dimension of 12 mm×6 mm×1 mm. This type of piezoelectric element can excite transverse wave that the particle displacement is along the width direction and wave propagates along the length direction under the excitation of alternating electric field, the transverse wave has high sensitivity to holes and axial crack defects;

Type 2, as FIG. 3, the polarization direction 817 of piezoelectric element 801 is along the width direction; The positive electrode layer 815 and negative electrode layer 814 are located on the top and bottom surfaces which is perpendicular to the thickness direction, and clamp up and down with piezoelectric layer 816; The size of piezoelectric element 801 satisfies: length/thickness≥10, length/width≥2, the invention prefers dimension of 12 mm×6 mm×1 mm. This type of piezoelectric element can excite transverse wave that the particle displacement is along the width direction and wave propagates along the thickness direction under the excitation of alternating electric field, the transverse wave has high sensitivity to holes and depth-oriented crack defects;

Type 3, as FIG. 4, the polarization direction 817 of piezoelectric element 801 is along the thickness direction; The positive electrode layer 815 and negative electrode layer 814 are located on the top and bottom surfaces which is perpendicular to the thickness direction, and clamp up and down with piezoelectric layer 816; The size of piezoelectric element 801 satisfies: (length/thickness)$^2$≥10, (length/width)$^2$≥10, the invention prefers dimension of 30 mm×5 mm×1 mm. This type of piezoelectric element can excite longitudinal wave that the particle displacement is along the length direction and wave propagates along the same length direction under the excitation of alternating electric field, the longitudinal wave can make up for the above two kinds of transverse waves that have poor sensitivity to circumferential crack defects.

In the invention, piezoelectric element of type 1 was selected for weld defect detection as an embodiment, the dimension is 12 mm×6 mm×1 mm. When the length direction of piezoelectric element 801 is parallel to the length of inspected weld 2, this type of piezoelectric element can excite Feature Guided Waves that concentrated in the weld and propagate along the length direction under the excitation of alternating electric field, the transverse wave has high sensitivity to holes and axial crack defects.

Flexible substrate 803 is made of flexible film material with large acoustic transmission coefficient, it can fix and protect piezoelectric element 801 as well; The flexible substrate 803 is closely bonded to the upper surface of the inspected weld 2 with a certain curvature during testing.

Damping block 802 is made of epoxy resin composite material, matched with the acoustic impedance of piezoelectric element 801 to reduce vibration; Sound absorbing material 804 adopts flexible sound absorbing filler to absorb additional waves, and fix piezoelectric element 801, damping block 802 and several kinds of wires at the same time.

Logic switch 810 is used to control the working state of corresponding piezoelectric element 801, selecting testing method with different piezoelectric array through opening and closing logic switches 810; The piezoelectric array can include: linear type, T type and rectangular type array, it can be selected according to the requirement of inspected welds with different width and length. The working schematic of sensor with different piezoelectric array can be seen in FIG. 5-8.

The excitation time difference of each piezoelectric element 801 can be adjusted by delayer 811, to realize the synthesis and focusing of sound beam.

Figure 7:
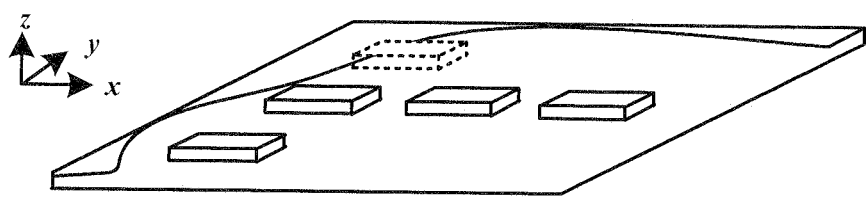
FIG. 7 is working schematic of sensor with T type piezoelectric array.
Figure 8:
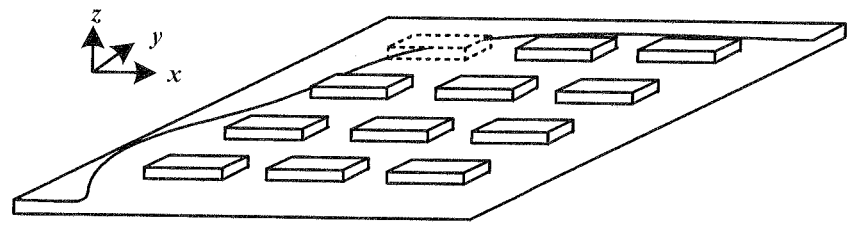
FIG. 8 is working schematic of sensor with rectangular type piezoelectric array.
Figure 9:
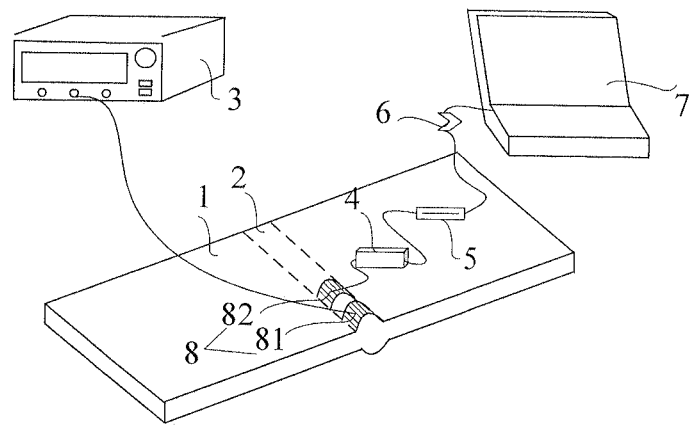
FIG. 9 is the detection system of a flexible sensor with piezoelectric array applied for weld defect detection based on Feature Guided Waves.

As an embodiment, from FIG. 9, plate 1 is welded by two 245 steel plates with dimension of 600 mm×600 mm×5 mm each, the welding method is automatic submerged arc welding. Inspected weld 2 has 600 mm length, 24 mm width, and 2 mm reinforcement on both upper and bottom sides. According to the width of inspected weld 2 and size of piezoelectric element 801 that selected, the invention prefers T type piezoelectric array with 3 rows and 3 columns for testing, as shown in FIG. 7.

Working process: in order to detect whether there is any defects in the inspected weld, the following steps are taken for non-destructive testing:

Step (1), put two sensors 8 closely bonded to the upper end surface of the inspected weld 2 in plate 1, the length direction of piezoelectric element 801 of sensor 8 is parallel to the length of inspected weld 2; The sensor near the end of inspected weld 2 is excitation sensor 81, another one is reception sensor 82, the spacing between excitation sensor 81 and reception sensor 82 is 150 mm; The positive electrode interface 813 of excitation sensor 81 is connected to the signal output port of signal generator 3; The positive electrode interface 813 of reception sensor 82 is connected to pre-amplifier 4; The pre-amplifier 4 is connected to filter circuit 5; The filter circuit 5 is connected to signal collection board 6; The signal collection board 6 is connected to upper computer 7; The upper computer 7 has multi-channel signal processing software, which is used for signal analysis and extraction of defect information;

Step (2), before testing, the logic switches 810 of excitation sensor 81 are set up firstly to select the testing method with T type piezoelectric array; At the same time, the delayer 811 of excitation sensor 81 are all set to 0; Then, the logic switches 810 of reception sensor 82 are set up, making the first piezoelectric element 801 of first column work as a signal reception point 1;

Step (3), when testing, open the signal generator 3, producing 20-cycle HANNING windowed tone burst signal as excitation signal and transferred to the excitation sensor 81, the central frequency is 200 kHz; The excitation sensor 81 excites Feature Guided Waves in the inspected weld 2 which can propagate along the inspected weld 2; Then the reflected signal is received by reception sensor 82; After the signal amplification and signal smoothing by pre-amplifier 4 and filter circuit 5, the reflected signal would be collected and recorded by signal collection board 6 with sampling rate of 5 MHz and above, then transferred to the upper computer 7; So far, the first set of data collection is completed;

Step (4), change the logic switches 810 of reception sensor 82 and make the second piezoelectric element 801 of first column work as a signal reception point 2; Repeat Step (3) and collect a second set of data. Similarly, the fifth set of data is collected;

Step (5), use multi-channel signal processing software in the upper computer 7 to analyze multiple sets of data, extract defect information and generate testing reports;

Step (6), finish the testing and tidy up the instruments.

Figure 10:
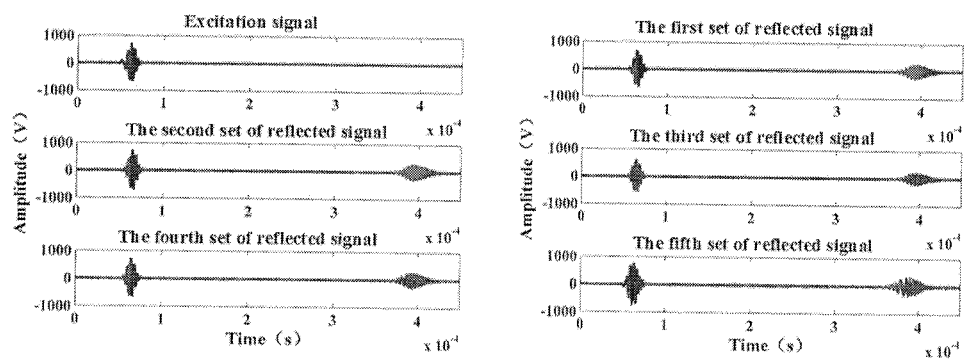
FIG. 10 is reflected signal drawn by the upper computer 7, when adopt the flexible sensor with piezoelectric array applied for weld defect detection based on Feature Guided Waves and its testing method in the invention.

By the flexible sensor with piezoelectric array applied for weld defect detection based on Feature Guided Waves and its testing method in the invention, the reflected signal drawn by the upper computer 7 is shown in FIG. 10. Testing method of T type piezoelectric array with 3 rows and 3 columns is adopted, and five sets of data is collected. From the figure, the incident waves and edge reflections of all waves are clearly, and between them there are no additional wave packets exist, it can be preliminarily determined that there is no defect in the inspected weld 2. Further analysis results can be obtained by the multi-channel signal processing software in the upper computer 7.

As a conclusion, the invention published a flexible sensor with piezoelectric array applied for weld defect detection based on Feature Guided Waves and its testing method. The sensor comprises of several piezoelectric elements which form a matrix, and arranged on a flexible substrate; Each piezoelectric element is covered with a damping block and surrounded by sound absorbing material, the sensor shell is packet with flexible protective film; Each positive electrode wire of all piezoelectric elements cascades a logic switch and a delayer, then parallel connects to positive electrode bus. The piezoelectric elements can be divided into three types, and excite three different modes of Feature Guided Waves respectively, they have different sensitivity to different types of defects and can realize complement. The sensor can select testing method with different piezoelectric array through logic switches, such as linear type, T type and rectangular type array, and meet the requirement of inspected weld with different curvature surfaces and structures; The excitation time difference can be adjusted by delayer, to realize the synthesis and focusing of sound beam. The sensor has simple structure, strong adaptability and high detection efficiency, which is especially suitable for the quick in-service inspection of long distance welds in large equipment, it has high degree of automation.

In the description of this specification, reference terms such as "an embodiment", "some embodiments", "indicative embodiments", "example", "specific examples", or "some examples" refer to the combination with that embodiment or example to describe the specific characteristics, structures, material or features which is included in at least one embodiment or example of the invention. In this specification, the indicative statement of the terms above does not necessarily refer to the same embodiments or examples. Moreover, the specific characteristics, structures, material or features that described can be combined in an appropriate manner in any one or more embodiments or examples.

Although embodiments of the invention have been shown and described, the ordinary technicians in this field can understand that: these embodiments can be varied, modified, replaced, and altered within the principles and purposes of the present invention. The scope of the invention is limited by the claims and their equivalents.

The invention claimed is:

1. A flexible sensor with a piezoelectric array for weld defect detection based on Feature Guided Waves, wherein the sensor comprises a plurality of piezoelectric elements which form a matrix, arranged on a flexible substrate;
   wherein each piezoelectric element is covered with a damping block;
   wherein each damping block and piezoelectric element are surrounded by sound absorbing material; and wherein each sensor is packaged within a flexible protective film;
   wherein electrode wires of the piezoelectric elements are parallel connected to a negative electrode bus;
   wherein a positive electrode wire of the piezoelectric elements cascade a logic switch and a delayer, and are parallel connected to a positive electrode bus; and
   wherein the positive electrode bus and negative electrode bus are wired out by a positive electrode interface and a negative electrode interface respectively, and connected to external equipment.

2. The flexible sensor of claim 1, wherein
   each piezoelectric element is a long strip, including: a positive electrode layer, a negative electrode layer and a piezoelectric layer;
   and the piezoelectric layer is held by a positive electrode layer and a negative electrode layer respectively from an upper and bottom or left and right.

3. The flexible sensor of claim 2, wherein the piezoelectric layer is formed of a piezoelectric ceramic or piezoelectric composite material; and
   the positive electrode layer and negative electrode layer are formed of silver, copper, gold or platinum.

4. The flexible sensor of claim 2, wherein the piezoelectric elements are divided into three types, Type 1, Type 2, and Type 3, and excite three different modes of Feature Guided Waves respectively, each having a different sensitivity to different types of defects:
   wherein in Type 1, a polarization direction of the piezoelectric element is along a width direction; wherein the positive electrode layer and negative electrode layer are located in left and right sides which are perpendicular to a length direction, and clamp left and right with the piezoelectric layer; and the size of the piezoelectric element satisfies the equation: length/thickness≥10, length/width≥2;
   wherein in Type 2, a polarization direction of the piezoelectric element is along a width direction; wherein the positive electrode layer and negative electrode layer are located on top and bottom surfaces which are perpendicular to a thickness direction, and clamp up and down with the piezoelectric layer; and the size of the piezoelectric element satisfies the equation: length/thickness≥10, length/width≥2; and
   wherein in Type 3, a polarization direction of the piezoelectric element is along a thickness direction; wherein the positive electrode layer and negative electrode layer are located on the top and bottom surfaces which are perpendicular to the thickness direction, and clamp up and down with the piezoelectric layer; and the size of the piezoelectric element satisfies the equation: (length/thickness)$^2$≥10, (length/width)$^2$≥10.

5. The flexible sensor of claim 1, wherein the piezoelectric elements are divided into three types, Type 1, Type 2 and Type 3, and excite three different modes of Feature Guided Waves respectively, each having a different sensitivity to different types of defects:
   wherein in Type 1, a polarization direction of the piezoelectric element is along a width direction; wherein the positive electrode layer and negative electrode layer are located in left and right sides which are perpendicular to a length direction, and clamp left and right with the piezoelectric layer; and the size of the piezoelectric element satisfies the equation: length/thickness≥10, length/width≥2;
   wherein in Type 2, a polarization direction of the piezoelectric element is along a width direction; wherein the positive electrode layer and negative electrode layer are located on top and bottom surfaces which are perpendicular to a thickness direction, and clamp up and down with the piezoelectric layer; and the size of the piezoelectric element satisfies the equation: length/thickness≥10, length/width≥2; and
   wherein in Type 3, a polarization direction of the piezoelectric element is along a thickness direction; wherein the positive electrode layer and negative electrode layer are located on the top and bottom surfaces which are perpendicular to the thickness direction, and clamp up and down with the piezoelectric layer; and the size of the piezoelectric element satisfies the equation: (length/thickness)$^2$≥10, (length/width)$^2$≥10.

6. The flexible sensor of claim 1, wherein the flexible substrate is formed of a flexible film material with a large acoustic transmission coefficient; and the flexible substrate is closely bonded to an upper surface of the bond with a certain curvature during testing.

7. The flexible sensor of claim 1, wherein the damping block is made of a epoxy resin composite material, matched with the acoustic impedance of the piezoelectric element; and the sound absorbing material forms a flexible sound absorbing filler.

8. The flexible sensor of claim 1, wherein the logic switch is adapted to control the working state of corresponding piezoelectric element, selecting testing method with different piezoelectric array through opening and closing logic switches; and the piezoelectric array includes a linear type array, a T type array and a rectangular type array, configured to inspect welds having different widths and lengths.

9. The flexible sensor of claim 1, wherein the excitation time difference of each piezoelectric element is adjustable by the delayer, to produce a synthesis and focusing of a sound beam.

10. A testing method for a flexible sensor with piezoelectric array applied for weld defect detection based on Feature Guided Waves, comprising:
   Step 1, placing first and second sensors as claimed in claim 1 closely bonded to an upper end surface of the weld to be inspected with a length direction of the piezoelectric element of the sensor is parallel to a length of inspected weld; wherein the sensor near an end of the inspected weld is an excitation sensor, and another sensor is a reception sensor, with a spacing between the excitation sensor and reception sensor being more than 10 cm; connecting a positive electrode interface of the excitation sensor to a the signal output port of a signal generator; connecting a positive electrode interface of a reception sensor to a pre-amplifier; connecting a pre-amplifier to a filter circuit; connecting a filter circuit to a signal collection board; connecting a signal collection board to an upper computer; which has multi-channel signal processing software, which is used for signal analysis and extraction of defect information;

Step 2, before testing, setting logic switches of the excitation sensor firstly to select a testing method with the piezoelectric array, and simultaneously setting the delayer of the excitation sensor to improve consistency of sound beam; setting up the logic switches and delayer of the reception sensor, making one of the piezoelectric elements function as a signal reception point;

Step 3, when testing, open the signal generator, producing a HANNING windowed tone burst signal as an excitation signal and transferred to the excitation sensor; wherein the excitation sensor excites Feature Guided Waves in the inspected weld along the inspected weld; receiving the reflected signal by the reception sensor; smoothing the signal amplification and signal by a pre-amplifier and filter circuit, wherein the reflected signal is collected and recorded by the signal collection board, and transferred to the upper computer;

Step 4, change the logic switches and delayer of the reception sensor and making the other piezoelectric element work as a signal reception point; and repeating Step 3 and collecting a second set of data; and an N th set of data; and Step 5, using a multi-channel signal processing software in the upper computer to analyze multiple sets of data, extract defect information and generate testing reports.

* * * * *